(12) United States Patent
Estep

(10) Patent No.: US 6,941,226 B2
(45) Date of Patent: Sep. 6, 2005

(54) METHOD FOR DETERMINING, RECORDING AND SENDING GPS LOCATION DATA IN AN UNDERWATER ENVIRONMENT

(75) Inventor: Randall S. Estep, Harrisonburg, VA (US)

(73) Assignee: Trilithic, Inc., Indianapolis, IN (US)

( * ) Notice: Subject to any disclaimer, the term of this patent is extended or adjusted under 35 U.S.C. 154(b) by 0 days.

(21) Appl. No.: 10/435,384

(22) Filed: May 12, 2003

(65) Prior Publication Data

US 2004/0068371 A1 Apr. 8, 2004

Related U.S. Application Data

(60) Provisional application No. 60/384,716, filed on May 31, 2002.

(51) Int. Cl.[7] .............................. G01S 15/00; G01S 3/80
(52) U.S. Cl. ......................... 701/213; 367/40; 367/131
(58) Field of Search .............................. 701/213; 367/5, 367/6, 131, 127, 134, 99, 117, 118, 40, 41, 137

(56) References Cited

U.S. PATENT DOCUMENTS

| 5,119,341 A | * | 6/1992 | Youngberg | 367/5 |
| 5,231,609 A | * | 7/1993 | Gaer | 367/99 |
| 5,331,602 A | * | 7/1994 | McLaren | 367/6 |
| 5,838,816 A | * | 11/1998 | Holmberg | 382/157 |
| 6,163,503 A | * | 12/2000 | Gudbjornsson | 367/6 |

FOREIGN PATENT DOCUMENTS

WO    PCT/US01/20064    6/2001

* cited by examiner

Primary Examiner—Thomas G. Black
Assistant Examiner—Dalena Tran
(74) Attorney, Agent, or Firm—Whitman, Curtis & Christofferson, P.C.

(57) ABSTRACT

Underwater position determination is provided by combining sonar-derived ranging data between a sonar receiver and a sonar transmitter with GPS position data to provide geographically-referenced position data accurately representing the position of a sonar receiver carried or worn by a diver or submersible vehicle. Function and accuracy enhancements are provided to compensate for diver and sonar transmitter and depth difference and differences of sonar signal propagation speed as well as several techniques of compensation for change of position of the GPS receiver and for logging diver and/or vehicle path.

24 Claims, 7 Drawing Sheets

METHOD FOR DETERMINING, RECORDING AND SENDING GPS LOCATION DATA IN AN UNDERWATER ENVIRONMENT

CROSS-REFERENCE TO RELATED APPLICATIONS

This application claims priority of U.S. Provisional Application Ser. No. 60/384,716, filed May 31, 2002, which is hereby fully incorporated by reference.

BACKGROUND OF THE INVENTION

1. Field of the Invention

The present invention generally relates to position determination utilizing a Global Positioning System (GPS) and, more particularly, to the determination and marking of position in an underwater environment utilizing GPS information.

2. Description of the Prior Art

Terrestrial Global Positioning Systems (GPS) have been available for several years. Such systems utilize communications with a plurality of satellites which are in known locations (e.g. geostationary orbits) for location of position of a GPS receiver with high accuracy (e.g. usually about six feet or less) on or above the earth's surface. Unfortunately, GPS is not effective underwater due to the inability of GPS signals to properly propagate in water. Current state of the art in underwater use of GPS as a position locator is restricted to an array towed by a diver or underwater vehicle in which the actual GPS receiver remains on a surface float flexibly tethered to the diver or vehicle. Naturally, in this configuration, accuracy is restricted to the inherent tolerances of the GPS receiver combined with error introduced by the actual vertical proximity (and related horizontal offset from the GPS receiver) of the diver or vehicle which is obviously influenced by prevailing currents and the length of the tether. Although GPS can be deployed on the water in a rather cumbersome configuration, such as described above, current conventional thought in this area states that GPS is not practical to use underwater.

However, for some purposes such as underwater salvage or archaeology in the hostile environment of the ocean or other bodies of water, especially when subject to changes of visibility conditions, accurate position location can be even more critical than some other GPS applications. For example, when it is necessary to leave a diving site of interest, it may be difficult to relocate the same site at a later time under different conditions, particularly where the sub-surface terrain may have been altered by intervening current or weather conditions. In the field of archaeology, it is also often important to make measurements and determine directions to accurately document the locations of artifacts as discovered. Further, it is considered to be an enhancement to safety of personnel or equipment to accurately track the position of divers or submersible devices while submerged particularly when it is inconvenient or undesirable to maintain a tether to the submerged personnel or equipment.

A system exists and is commercially available for informing divers, through sonar signaling from a tethered transmitter which may be affixed, for example, to a boat anchor, which will provide a distance and bearing from the diver to the sonar transmitter. This system is known and sold as the "EyeSee Sonar"™ by Xios Diving Technology of Couvet, Switzerland. The EyeSee™ system employs a sonar transmitter of small size which can be tethered to a support boat in a manner not critical to its use to transmit a sonar signal which has good transmissiveness through water as a compressional wave. A receiver unit is worn by the diver and contains a processor for computing a range and bearing from a receiver carried or worn by the diver to the transmitter and displaying the range and bearing to the diver. It is claimed by the manufacturer that the operational range of the EyeSee™ system is at least 3,300 feet. However, the distance indicated by the EyeSee™ system is a direct distance (e.g. effectively line-of-sight) between the transmitter and receiver and does not reflect the difference in horizontal location between the transmitter and receiver unless the diver and transmitter are at the same depth. Further, the EyeSee™ system has no capability of interfacing with a GPS system in any way or determining or reporting geographically or globally referenced data but only the position of the receiver relative to the transmitter by means of a sonar signal. Further, no provision is made in the EyeSee™ system for correction of the distance or bearing determination for effects such as relative salinity, temperature and other conditions of water which can affect the propagation speed of a sonar signal by which the distance determination is made. Furthermore, there is no provision in the EyeSee™ system for the communication of any data between the transmitter and receiver with or superimposed upon the sonar signal and the transmitter of the EyeSee™ system functions merely as a beacon while the receiver displays only distance and bearing to the transmitter for the limited purpose of allowing the diver to more readily locate the transmitter and, from that location, locate the support boat by following the transmitter tether, anchor rope or the like.

SUMMARY OF THE INVENTION

It is therefore an object of the present invention to provide a system for position determination of personnel and/or equipment having an accuracy generally comparable to Global Positioning Systems (GPS) and utilizing GPS for providing an absolute and repeatable position location in an underwater environment.

It is another object of the present invention to provide for transmission and display of relative and absolute position of submerged personnel and/or equipment to submerged personnel and/or on a surface vessel.

In order to accomplish these and other objects of the invention, the invention provides a device and methodology for accurately and effectively employing the use of GPS in underwater environments by providing for combining of sonar ranging information with GPS data to provide an estimate of geographically-referenced position. The method and apparatus described enables support personnel on a boat to determine the GPS coordinates of an independent diver or divers or vehicle within reasonable proximity to the boat and allows a diver or divers or vehicle to determine their own GPS coordinates and allows a diver or divers or vehicle to permanently mark and record GPS coordinate in an underwater environment. The invention may be implemented as a system for position determination or as an enhancement for a sonar ranging arrangement and may be integrated with a diving mask having a processor and a display.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
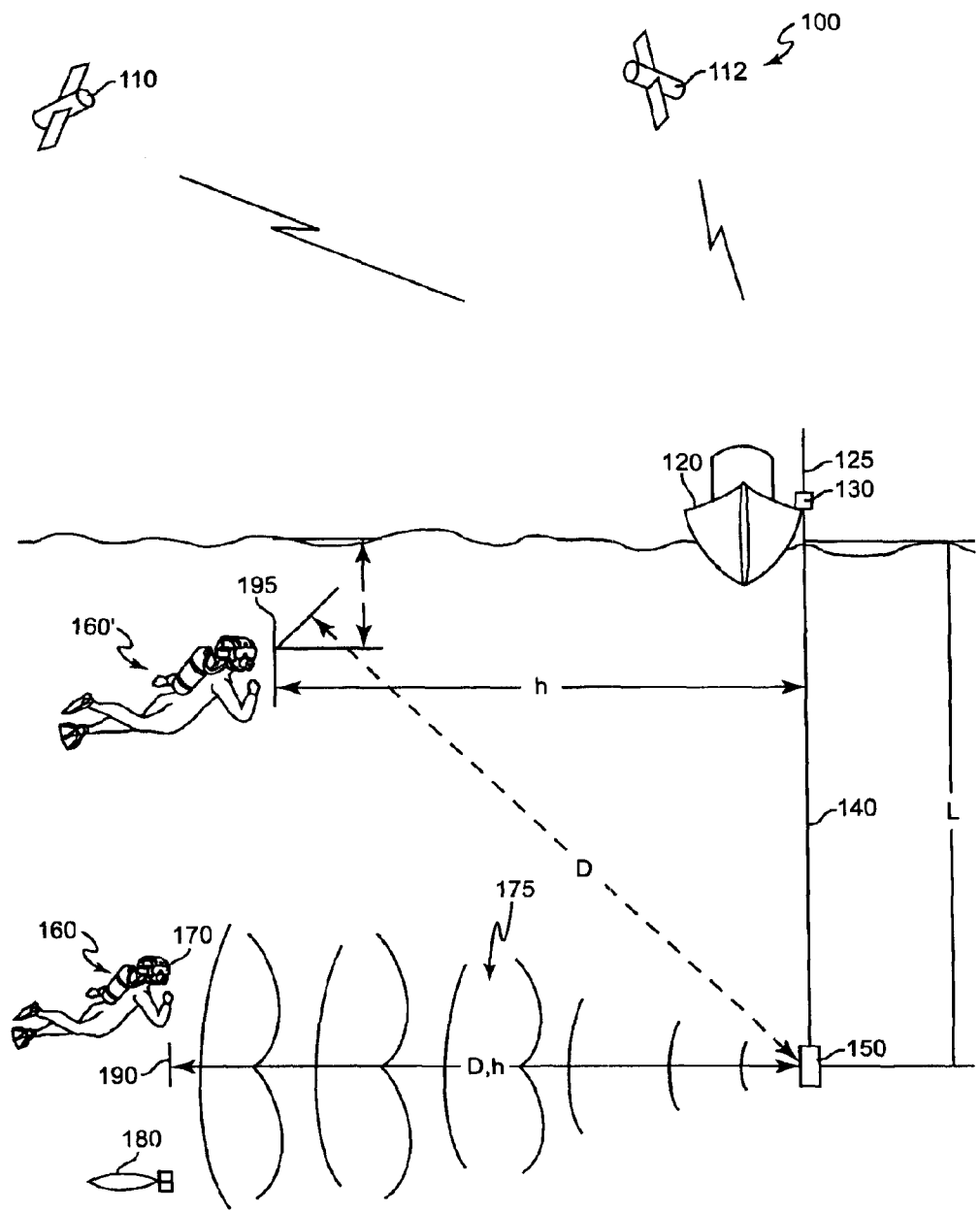
FIG. 1 is a generalized depiction of an exemplary deployment of the invention.

Referring now to the drawings, and more particularly to FIG. 1, there is shown a basic and schematic diagram of a generalized deployment of the invention and the communication links which may be utilized in the practice of the invention and which will provide an understanding of the basic principles thereof sufficient to its successful practice. Following a discussion of the basic principles of the invention, several embodiments will be described in detail to provide a description of the inclusion of a number of variations of architecture and provision of perfecting features of the invention which are preferred for different particular applications of the invention and which will be exemplary of applications of the invention to other environments.

In the system 100 in accordance with the invention as depicted in FIG. 1, GPS satellites 110, 112 are shown communicating with a processor system 130 including a GPS receiver 125 carried by a surface vessel 120. Generally, communication is conducted with three or more such satellites for purposes of accurate triangulation of position and confirmation or interpolation of the resulting positional information concerning the location of the GPS receiver 125. However, adequate information for determining location on the Earth's surface can generally be obtained in regard to only two such satellites. (That is, while triangulation from only two satellites provides ambiguous results, erroneous values can often be eliminated by simple logical processes.) The illustration of satellites 110 and 112 should thus be understood as illustrating an arbitrary number of GPS satellites. Accordingly, GPS information regarding the location of receiver 125 is available at the location of the processor 130.

A sonar transmitter or transceiver 150 is preferably positioned directly below the GPS receiver 125 connected to processor, preferably by a calibrated tether 140 which is somewhat rigid or otherwise limited in horizontal movement such as by weighting. Other locations could, of course, be employed but any horizontal displacement from the location of the GPS receiver 125 should be compensated. The tether length is preferably calibrated since GPS data can provide a height coordinate which should be accounted for by an appropriate offset value corresponding to the tether length. As alluded to above, a sonar receiver and processor 170 are carried or worn by a diver 160 or a vehicle 180 and the distance and bearing between the sonar transmitter 150 and the sonar receiver 180 can be locally determined, for example, in the manner of the EyeSee™ system discussed above.

Figure 1A:
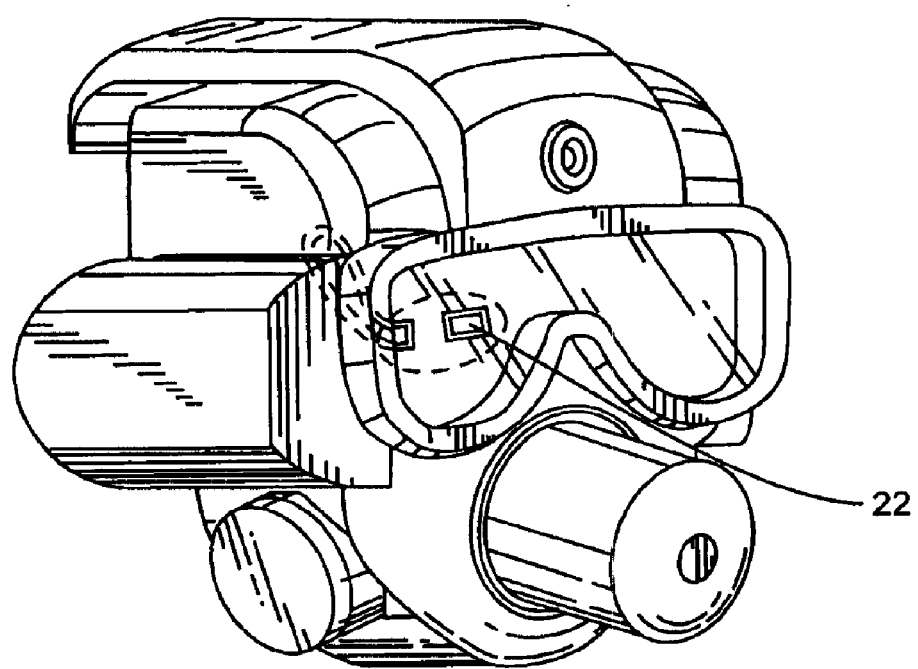
FIG. 1A is a preferred form of diving mask for use with the invention and including at least a portion of the system thereof.

In its simplest form, the GPS data available from GPS receiver 125 (and, preferably, known offsets such as the tether length, horizontal displacement of tether 140 from GPS receiver 125 and the like) is input to the receiver 170 and, possibly processor 130 and stored as benchmark GPS position data. Then, as the diver or vehicle moves about underwater, the distance and bearing derived from the sonar link 175 is added to the benchmark GPS data to provide global and geographically referenced position data to the diver, preferably using a mask-mounted display such as is illustrated in FIG. 1A and described in U.S. patent application Ser. No. 09/914,969 which is hereby fully incorporated by reference, or relayed back to the surface vessel 120 and processor 130 through sonar transceiver 150 as will be described in greater detail below along with perfecting features allowing updating of the GPS data and other enhancements to increase accuracy of the GPS data in regard to the position of a diver or vehicle.

First Embodiment

Figure 2:
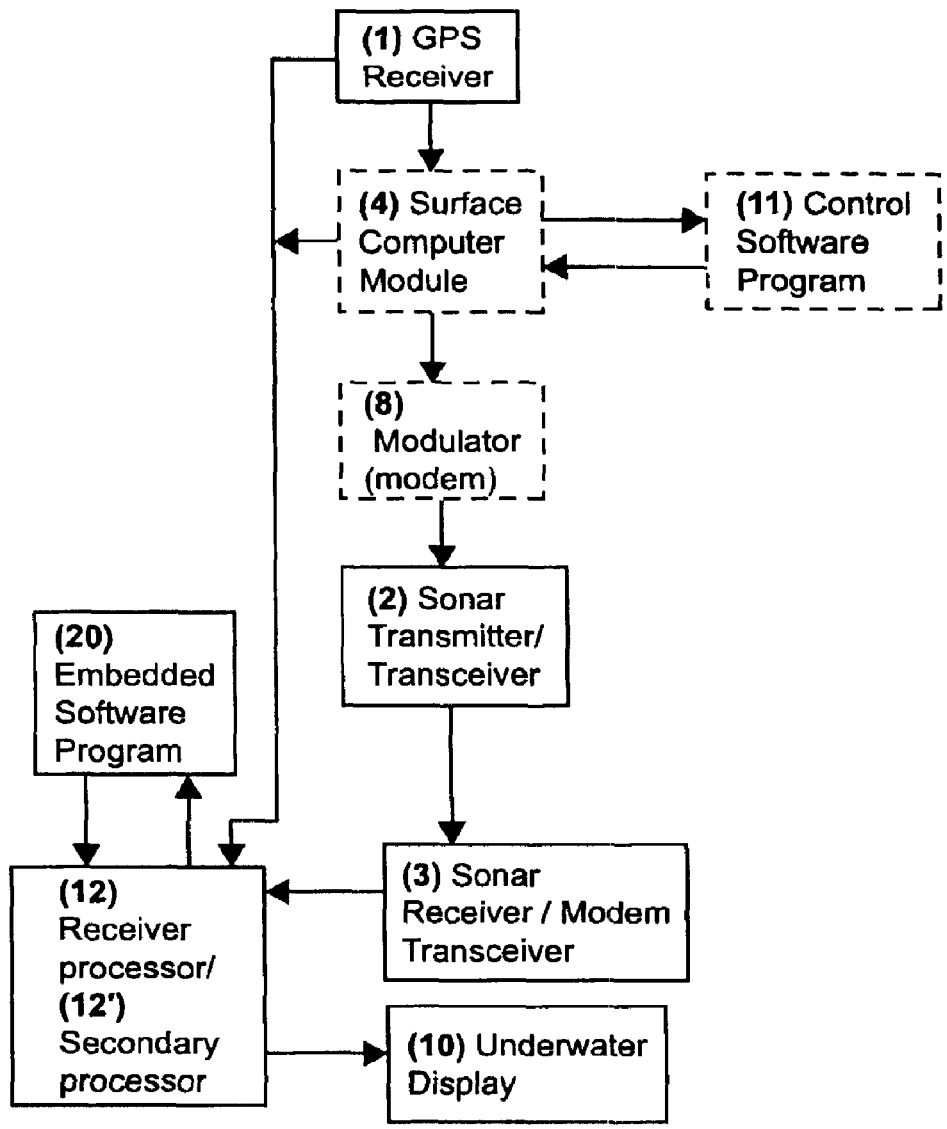
FIG. 2 is a flow diagram or high-level schematic block diagram of an embodiment of the invention illustrating its basic principles.

Referring now to FIG. 2, a first embodiment of the invention will be discussed to convey an understanding of the basic principles of the invention sufficient to its successful practice. In the simplest form of this embodiment, a GPS receiver 1 is mounted on a boat preferably as discussed above in connection with FIG. 1. A small computer (e.g. surface computer module 4 and control software program 11) may be connected to the GPS receiver but is not necessary in the simplest form of the invention. A modulator 8 may be connected to the computer. A sonar transmitter 2 is provided and may be connected to the modulator 8. A diver or vehicle is in the water and preferably attached to a sonar receiver 3 associated with a receiver processor 12 and an embedded software program 20 which provides ranging data as in the EyeSee™ system described above and the combining of the ranging data with the GPS data input to processor 12 form GPS receiver 3 or otherwise as will be described below. The sonar transmitter 2 is activated and placed in the water with a preferably calibrated tether length. The tether length is entered as an offset value in the control software program residing on the computer 4, if used, as will be discussed in greater detail below.

As a matter of nomenclature and usage hereinafter in regard to this and other embodiments, it should be understood that a special purpose or suitably programmed general purpose "receiver processor 12" is provided in connection with the sonar receiver which will carry out the basic processing required for developing ranging data representing the direction and distance of the receiver relative to the transmitter. In accordance with the invention, additional data processing functions are provided and these functions may be provided by a separate processor referred to as a "secondary processor 12'", as may be preferred in the event the invention is embodied as an attachment, "add-on" or retrofit to an existing sonar ranging arrangement. In other applications or embodiments of the invention it may be preferable to combine the receiver processor 12 and the secondary processor 12' as a single processor with suitably extended programming even though the ranging function may be considered separately from other ranging functions the term "processor 12, 12'" or "submerged processor 12, 12'" will be used for collective reference to the receiver processor and secondary processor regardless of whether or not the processors are integrated as a single processor or embodied as separate processors. In addition, as will be discussed below, it is considered desirable but not essential to the successful practice of the invention to provide an additional processor connected to receive input from the GPS receiver 125 which will be referred to hereinafter as surface computer module or surface processor using reference numerals 130 or 4.

The GPS receiver collects positioning information from the appropriate satellite signal sources and downloads information to computer module 4 (or to processor 12, 12'). The diver or vehicle(s) receiver 3 is temporarily attached to the GPS receiver 1 or surface computer module 4 and a benchmark GPS position is recorded. The diver or vehicle enters the water and begins to move away from the boat. The sonar receiver 3 attached to the diver or vehicle receives a signal from the sonar transmitter 2 and receiver processor 12 makes a distance and direction (to the sonar transmitter 2) calculation that is passed to the secondary processor 12', which preferably resides within the sonar receiver 3, and which further compares and/or combines the benchmark GPS data with the distance and direction data and subsequently derives a corrected set of GPS coordinates corresponding to the position of the diver or vehicle, calculated by an embedded software program 20 that resides on the secondary processor 12'. The secondary processor 12' constantly compares the benchmark GPS data to the distance and direction data that is being processed in the sonar receiver 3 and extrapolates the true GPS position via an algorithm that states: benchmark GPS data+distance (vector)+direction (vector)=actual GPS position, and transports this data with distance and direction data to the output display screen on the sonar receiver. In this manner, the distance and direction to the transmitter as well as the prevailing GPS coordinates are known to the diver or vehicle as they move through the water by virtue of referring to the output display of the sonar receiver or guidance system of an underwater vehicle, allowing navigation to occur by GPS.

It should be noted that in the simplest form of the invention, provision is made for storage of the benchmark GPS data and for combining the sonar-derived ranging data (e.g. distance and direction) with the GPS (position) data to allow relatively accurate geographically referenced position data to be provided to the diver or vehicle. Therefore, in the simplest and most basic form of the invention the surface computer module 4 and software control program 11 are not necessary to the practice of the invention. Similarly, the modulator 8 is not necessary to the successful practice of the invention in accordance with its basic principles. However, processor 4 and modulator 8 could be provided for reasons other than the practice of the invention. For example, modulator 8 could be provided to establish a voice communication link with the diver or vehicle control while the surface computer module could be provided for automating the loading of GPS data into the receiver processor 12 or automatic control of the support boat to maintain approximate position. However, as will now be discussed, the provision of the processor 4 and the modulator 8 are both preferred to support desirable enhancements to the basic invention.

As is well-recognized, support boat 120 can move significant distances (e.g. greater than the accuracy of the GPS system) over time due to wind or water currents and the like even if well-anchored. Therefore, it is preferred to provide a surface computer 4 to compare current GPS data with stored GPS data to monitor any position shift of the support boat 120. It is also desirable for the surface computer 4 to be used for surface storage of a duplicate of the GPS data loaded into the receiver processor 12 for back-up and error recovery in the event of malfunction of the processor 12, 12' which must operate in a severe environment and is subject to possible damage. Moreover, the surface processor 4 can provide periodic or continuous updates of the GPS data to receiver processor 12 through modulator 8 to superimpose, multiplex or otherwise combine the updated GPS data with the sonar signal transmitted by sonar transmitter 2 over the sonar communication link with sonar receiver 3. While it is preferred to begin operation of the invention using benchmark GPS data entered into processor 12, 12' with the sonar receiver in proximity to the GPS receiver 1, the use of initial benchmark data is not strictly necessary when GPS data can be sent to the secondary processor 12' through a sonar communication link.

A further enhancement to the invention can also be provided by the use of a modulator/demodulator or modem for modulator 8 and transceivers for sonar transmitter 2 and sonar receiver 3 in order to support bidirectional communications for the ranging and/or combined ranging and GPS data from the diver or vehicle to the support vessel 120. Such an enhancement also supports error checking and recovery as well as redundancy in the system of the invention as well as surface display and/or recording of geographically referenced diver or vehicle position data. In this regard, it should be understood that the invention can also be deployed to simultaneously monitor the position of plural divers and/or vehicles in any combination.

Embodiment Two

Figure 3:
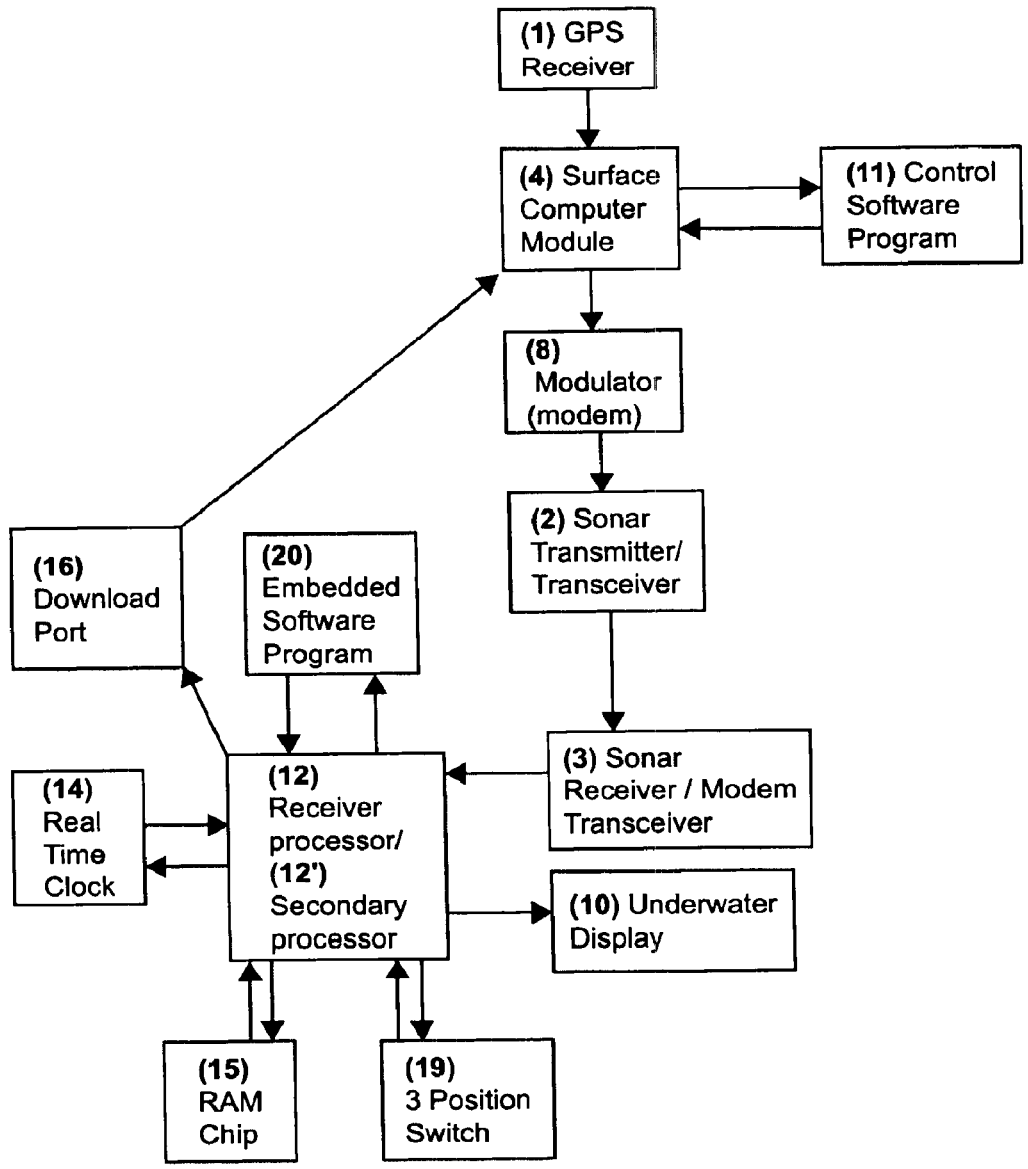
FIGS. 3, 4, 5 and 6 are flow diagrams or high-level schematic block diagrams illustrating embodiments of the invention including various perfecting features supporting additional and desirable functions of a system in accordance with the invention.

In a second embodiment of the invention as illustrated in FIG. 3 and including all of the elements discussed above in connection with FIG. 2, a user operable switch 19 is added to the sonar receiver that is attached to the diver or vehicle that allows the storage of the prevailing GPS coordinates and the time/date (e.g. time stamp of the mark operation) provided by real time clock 14 that the position was recorded in RAM 15 which is attached to the secondary processor 12' when the switch 19 is actuated. The amount of individual locations that can be marked is a function of the storage capacity of the RAM chip or board employed. A second user operable switch, preferably incorporated with switch 19 as a three-position switch, allows the activation of "Mark Recall" mode which is a secondary function of the software program 20 residing on the secondary processor 12' which preferably displays historical "mark" activations in the reverse order of which they were recorded. While not necessary to the successful practice of the invention, incorporation of the "mark" and "recall" switches in a single three-position switch is preferred because the "mark" and "recall" functions are, logically, mutually exclusive and incorporation of control for both into one switch is a simple and hardware-efficient technique for providing an interlock which prevents operator error in possibly invoking both operations simultaneously.

Additionally, a download port 16 is preferably provided on the sonar receiver unit 3 which is connected to the secondary processor 12' and RAM 15 that allows later transfer of the "marked" locations to a program residing on the Control Software Program 11 that plots the path of the diver or vehicle by GPS coordinate and traverse time (e.g. the difference of time stamps applied to respective marked locations) from one "mark" to the next. Alternatively, the marked locations can be transmitted through the sonar uplink as described above or the variation thereof described below. By virtue of the "mark" and "mark recall" functions, the diver or vehicle is able to mark particular points of interest as a matter of establishing navigational way points or for later location of a particular mark or for forward or reverse navigation by returning to marked locations in the order in which they were recorded or the reverse order of recordation, respectively.

As a further perfecting feature, in order to compensate for accumulated error introduced by the movement of the benchmark GPS receiver 1 on the seas after loading the benchmark GPS data into secondary processor 12 and inherent error caused by timing and the operating tolerances of the sonar transmitter/receiver system, an averaging function can be activated by manipulation of the "mark" switch which makes several measurements in a predetermined period of time and displays/records a mean average of the data collection sample. This can provide a "ground-referenced" correction or calibration by, for example, the diver remaining stationary at a submerged location and recording the combined data or ranging data several times. Any difference in the data recorded provides a calibration of the movement of the GPS receiver 1 and/or the sonar transmitter 2 and thus can provide a correction of the (e.g. benchmark) GPS data locally to the sonar receiver 3 and without transmission of updated GPS data through the sonar link from support vessel 120 as described above. This function can be readily implemented in software 20 together with other functions described herein.

Embodiment Three

Figure 4:
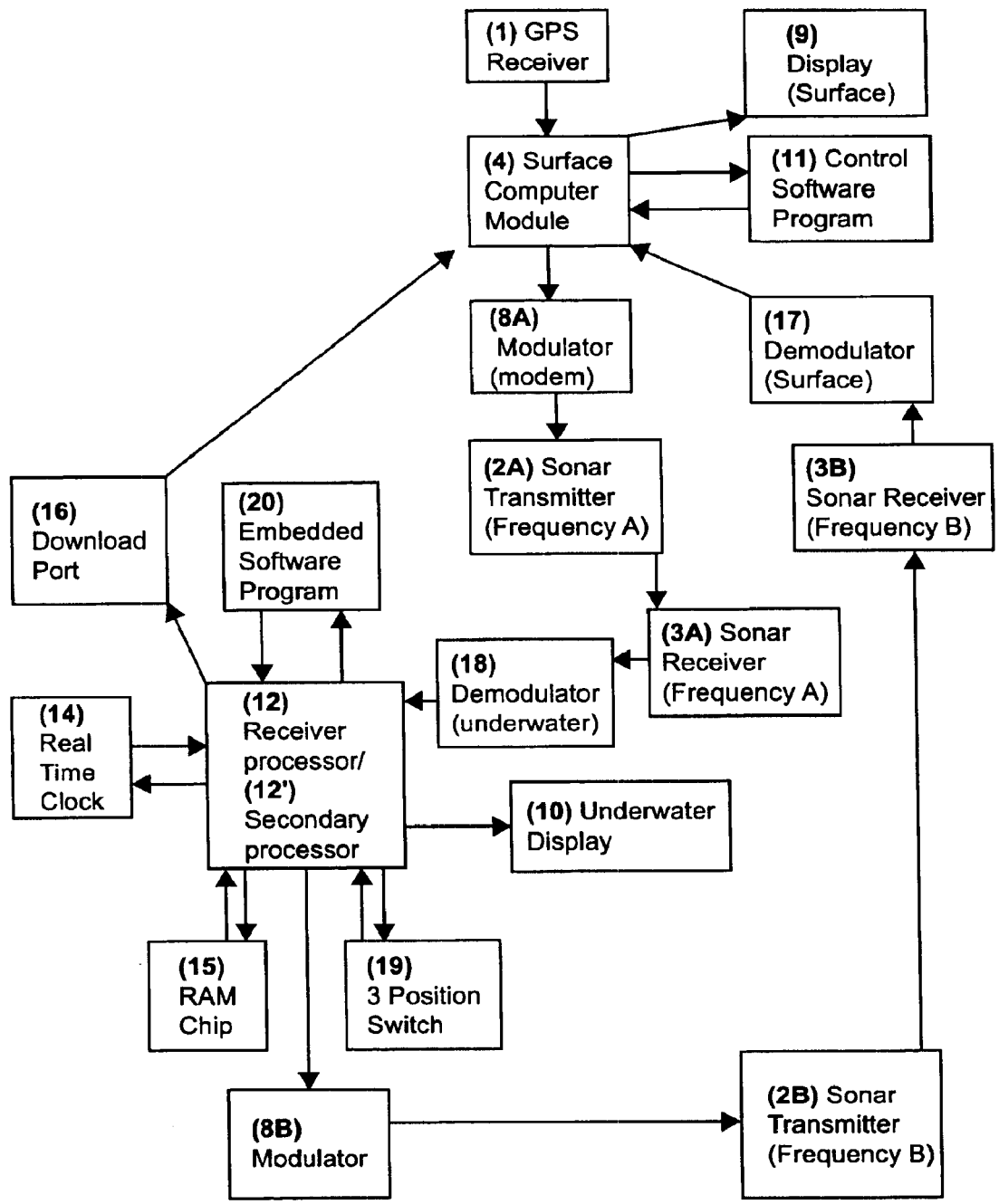

In this more complex embodiment illustrated in FIG. 4, the basic hardware configuration described in Embodiment One (FIG. 2) and/or Embodiment Two (FIG. 3) is augmented for increased functionality. The sonar transmitter 2 connected to the support vessel is pre-selected to broadcast of a first channel such as at Frequency A and is thus designated 2A. The sonar receiver 3, attached to the diver or vehicle is preselected and filtered to receive only Frequency A transmissions (also used as the sonar communication link for ranging) and thus designated 3A. A demodulator 18 is connected to the sonar receiver (for its input) and the secondary processor 12' (for its output) and preferably residing on the sonar receiver 3A attached to the diver or vehicle.

A modulator 8B is connected to the secondary processor 12' which is attached to the diver or vehicle. A sonar transmitter 2B preselected to broadcast on a second channel such as at Frequency B is connected to the modulator 8B. Likewise, a Frequency B sonar receiver 3B is placed in the water below the boat. A demodulator 17 is connected to the Frequency B receiver 3B (for its input) and to the surface computer module 4 (for its output). The Control Software Program 11 resides on the computer module (surface) and controls the communications at frequencies A and B which are chosen to be non-interfering (e.g. by differing in frequency by a few percent to an octave or more such that the two frequencies in the audible or near-audible range can be discriminated by a simple filter or the like). The surface computer module 4 is connected to a visual display 9 at the surface (e.g. on support vessel 120). In this manner, two separate communication paths are established for respective signaling directions between the support vessel 120 and the diver 170 and/or submersible vehicle 180.

Transmission of data to the diver 170 or vehicle 180 from the boat or support vessel 120 over the communication links established by these additional elements can occur in two distinct methods:

(1) As described in Embodiment One, the underwater sonar receiver 3A is attached to the surface computer 4 which is attached to the GPS receiver 1 so that benchmark coordinate data is received and stored prior to submersion. The Frequency A transmitter 2A merely sends a reference signal from which distance and direction data is derived by the sonar receiver attached to the diver or vehicle and is further processed by the secondary processor 12' on the sonar receiver 3A unit to yield estimated GPS coordinates, or (2) The GPS receiver 1 mounted on the boat 120 collects GPS positioning data and transfers that data continuously or periodically to the surface computer module 4. The Control Software Program 11, residing on the Surface Computer Module 4, preferably converts the data to a compressed digital data stream and introduces the data to the modulator 8A which then places the data on the carrier of Frequency A. This latter method (2), while more complex, nullifies error introduced by movement of the GPS receiver (boat) on the seas as it is transferring real time positioning data as opposed to the reference signal described in the former method (1), as described above for the frequency A communication link. However, in accordance with embodiment three, the frequency B communication link may be used as follows:

The GPS receiver 1 mounted on the boat collects GPS positioning data and transfers that data to the surface computer module 4. The Control Software Program 11, residing on the Surface Computer Module 4, converts the data to a compressed digital data stream and introduces the data to the modulator 8A which places the data on the carrier of Frequency A. The modulated signal is then transmitted through the water by the (boat) sonar transmitter 2A which is broadcasting at Frequency A. The signal is received by the Sonar Receiver 3A that is attached to the diver 170 or vehicle 180, where it is preselected and filtered to only recognize Frequency A transmissions. In its normal manner of functionality, the distance and direction information is calculated by the sonar receiver processor 12 and is passed through to the Secondary Processor 12' (or processor 12, 12' if a secondary processor is not separately provided and the function thereof provided through additional software executed by the receiver processor 12) where it will be matched with GPS data. While distance and direction data is being calculated on the sonar receiver processor 12, the signal is directed (e.g. by a signal splitter) to the demodulator where the actual GPS Receiver position coordinates that were placed on the carrier of Frequency A are extracted and then introduced to a separate secondary processor 12' (as may be desirable when the invention is deployed as an accessory or a retrofit to sonar ranging systems or to the sonar receiver processor 12) or processor 12, 12' where the data is matched to the corresponding result of the distance and direction calculation and then further processed via the algorithm described in Embodiment One to yield an extrapolated GPS coordinate position of the Frequency A Sonar Receiver 3A. This corrected data is then ported to the output display 10 of the Frequency A Sonar Receiver Unit 3 for the diver or vehicle. Simultaneously with refreshing the display, the corrected data is introduced to the software program 20 residing on the Processor 12, 12' residing on the Frequency A Sonar Receiver 3A unit which converts the data to a compressed digital data stream and introduces the resulting data to the modulator 8B which then places the data on the carrier of Frequency B. The modulated signal is then broadcast through the water by the Frequency B Transmitter, which is attached to the diver or vehicle. The signal is received by the Sonar Receiver 3B submerged beneath the boat 120, preselected and filtered to only recognize Frequency B transmissions and is connected to the Frequency B Demodulator 8B. The demodulated signal data, which represents the current location of the diver or vehicle at the time of Frequency B transmission is extracted and passed to the Control Software Program 11 that resides on the surface Computer Module 4. The Control Software Program 11 converts this raw GPS data to a graphical format and presents a representation of the diver or vehicles movement or traverse between locations as well as current GPS location as last received on the surface display 9, preferably by a video output port of the surface Computer Module 4.

Optionally, the traverse "map" representation is recorded by the Control Software Program for later review.

It should be appreciated that this embodiment is quite similar in this regard to the variation of the first embodiment in which modems are employed except that two non-interfering carrier signal channels (e.g. different frequencies) are used. This difference allows simultaneous bi-directional transmissions which may provide increased response speed and, further, allows a plurality of divers and/or vehicles to be simultaneously tracked. In this regard, frequency/carrier A can be used for communication in common to all such divers and/or vehicles and different channels/frequencies/carriers can be used to discriminate the respective divers or vehicles. Other discrimination techniques such as coded identifications (e.g. packet switching, multiplexing or the like) can also be employed.

Likewise, and as described in Embodiment Two, the location "Mark" function can be transmitted, received, displayed, and recorded by converting the "marked" location data to a separately identifiable data bit which is then modulated onto the carrier of Frequency B. Displayed and recorded location "Mark" data is identified separately from normal dive excursion traverse data and can be optionally represented or recorded with or without other data relative to the dive excursion traverse. Also as described in Embodiment Two, the data averaging principle can be applied during the location marking sequence for purposes of enhanced location accuracy in a manner independent of the transmission of GPS data from support vessel 120.

Embodiment Four

Figure 5:
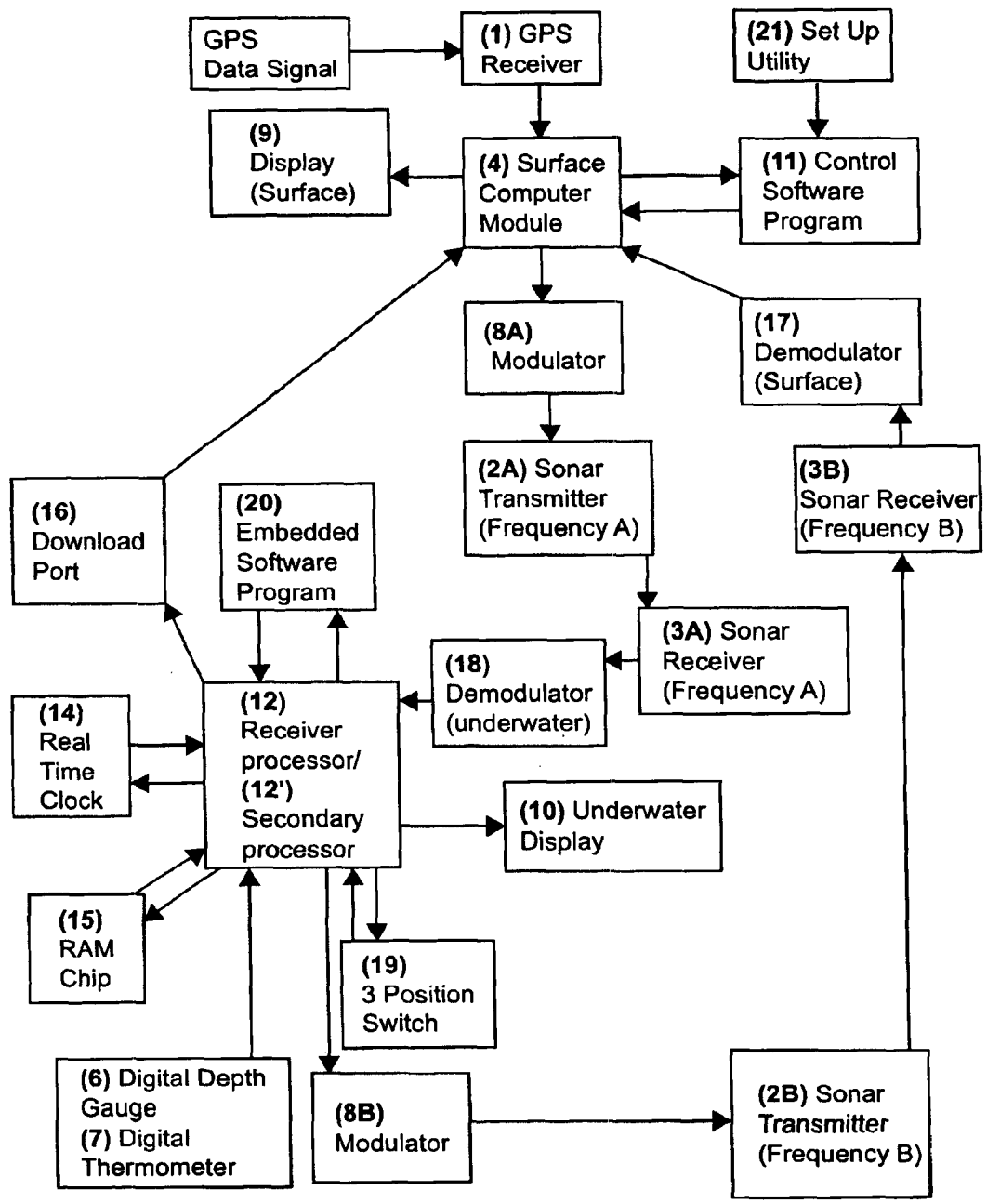

Many physical factors can contribute to error in the distance and direction calculations being performed by the processor 12, 12' and, as such, may introduce fundamental errors that affects ultimate GPS location calculation. For example, referring to FIG. 1, the sonar ranging described above reflects a distance D which may be at any angle above or below the depth of the transmitter as illustrated by the different positions of divers 160 and 160' which are the same distance from transmitter 150 but at different horizontal distances h parallel to the plane of sonar transmitter 150 and thus at different geographically referenced locations. Further, the measurement of distance D is subject to error due to variations in salinity, temperature or any other parameter that affects the propagation speed of the sonar signal. This embodiment, illustrated in FIG. 5, introduces additional sophistication to the system described in the above embodiments in order to quantify and compensate for those physical error contributions that are identifiable and to include their properties as corrections to the basic calculations being performed to increase accuracy of the position estimate.

Most commercial sonar transmitter/receiver ranging systems known in the art today are only extremely accurate as to position when the transmitter and receiver are positioned at the same depth in the water column and operate on a direct line of sight basis when the distance data developed by ranging is equal to the horizontal projection of that distance. In order to compensate for this deficiency, which renders ranging systems impractical in application to determine position, a few subtle offsets are included in calculation:

1) As described earlier, the boat Sonar Transmitter 150 is suspended beneath the boat 120 on a calibrated length tether 140. To ensure the maximum of stability of the submersion depth of the transmitter, the transmitter should be weighted if suspended by a rope tether or the tether should be of a stiff composition such as steel or fiberglass. The selected calibrated depth (i.e. 10 feet, 15 feet, etc.) is entered into a configuration set-up utility that is a sub-set of the Control Software Program 11 as a Z axis offset value expressed in feet or meters that demonstrates the actual vertical distance from the GPS Receiver to the actual sonar transmitting device 3, 150. Accordingly, a digital depth gauge 6 is incorporated with the primary processor 12 on the Frequency A or sole frequency Sonar Receiver unit that is attached to the diver or vehicle. When distance and direction calculations are performed utilizing this functional enhancement, distance from GPS Receiver to transmitter and actual depth of diver or vehicle are introduced as off-set values to the calculation. In this case, calculations performed regarding distance and direction from the GPS Receiver to the Frequency A or sole Sonar Receiver can now be expressed in terms of 1) the horizontal distance h rather than D from the Frequency A transmitter to the Frequency A sonar receiver by computing the angle above or below the plane of the transmitter using the difference between the depth information and the calibrated tether length offset, 2) the direction between the Frequency A transmitter to the Frequency A sonar receiver, 3) the difference in depth between the GPS receiver and the Frequency A transmitter, and 4) the difference in depth between the Frequency A transmitter and the Frequency A sonar receiver. In practice, only the offset vertical distance of the GPS Receiver to the tethered transmitter is manually entered via the user interface of the Control Software Program and is downloaded as an offset to the Sonar Receiver that is attached to the diver or vehicle prior to submersion and practical deployment of the system.

2) With or without benefit of the calculation offset described in (1) above, acoustic wave propagation speed factors can be incorporated in the distance and direction calculations. As input via the user interface to the Control Software Program, information as to whether the planned dive will occur in fresh water, brackish water or salt water can be entered. Dependent on the selection made, a specific characteristic velocity of propagation table will be employed that is representative of the selected salinity condition. In the case of salt water selection, a table will be utilized that represents a most common encountered composite of salinity conditions (e.g. open ocean, tidal rivers, etc.). If precise salinity conditions are known, as measured by electric resistance or specific gravity measurements, these actual values may be entered via the user interface of the Control Software Program and a more precise table will be utilized during distance and direction calculations.

3) Temperature of the prevailing waters will introduce a subtle but distinct influence on the propagation speed of the acoustic transmissions. Water temperature measurement results can be manually input into the Control Software Program as an additional offset value to be included in the distance and direction calculations by directing calculation references to a more sophisticated table that represents properties of temperature variations on acoustic wave propagation speed and, if desired, their differences in both salt and fresh water.

A more sophisticated variant of this concept introduces a digital thermometer 7 which may be attached, for example, to the Frequency A transmitter and electrically connected to the Surface Computer Module 4 which contains the Control Software Program 11. This Digital Thermometer sends a continuous stream of water temperature measurement results (as it is lowered into position, for example) to the Control Software Program 11 which makes ongoing adjustments to a temperature/propagation table, preferably provided in software 11 that is used for present time calculations.

In an even more complex but potentially more accurate configuration, a corresponding Digital Thermometer is attached to the secondary processor 12, 12' located on the Frequency A sonar receiver 3A unit that is attached to the diver or vehicle. In this configuration, temperature gradients at the point of Frequency A transmission and Frequency A reception are compared and a curve of gradual temperature changes over distance and depth is created by both the processor 12, 12' residing on the Frequency A sonar receiver 3A unit and the Control Software program 20 (or transmitted via frequency B to the surface for such processing by processor 4, or both), resulting in the creation of a hybrid temperature/acoustic signal propagation table based on specific excursion parameters mapped in two or three dimensions that is then introduced as an offset value to the distance/direction calculation.

If a known and quantifiable thermocline is found in the dive area, an additional offset can be manually input to the Control Software Program that includes temperature variations by depth. The digital depth gauge connected to the Frequency A sonar receiver 3A will provide real time depth data and as an adjunct to the inclusion of depth data described above as a component of the corrected distance and direction calculation, the processor 12, 12' which is attached to the diver or vehicle will further include the multi-level depth/temperature correlation, based on known properties of the effect of thermocline on acoustic signal propagation, in distance and direction calculations.

As thermoclines in a water column usually represent a drastic, rather than gradual, change in temperature gradient, the existence and properties in regard to depth and temperature change can be reported and graphically represented automatically by virtue of the corresponding Digital Thermometer(s) and ongoing communication link(s) as the diver or vehicle descends and traverses the water column and dive excursion region by a pre-set depth/temperature value that discerns a dramatic change in water temperature as opposed to a normal gradual change. Preferably, temperature data is additionally time/depth recorded archivally as well as being used for real time display by both the processor 12, 12' and surface based processor 4 and is optionally available for inclusion on any graphs, maps, or other archival representations that may be subsequently produced.

It should be appreciated that the above enhancements to positional accuracy of the sonar-based extension of a GPS system need only by implemented to a desired degree of accuracy such that the accuracy of the GPS system data (currently about six feet) will not be significantly degraded and that the position estimated in accordance with the invention will be of comparable accuracy to the GPS data. In any case, small and/or localized variations of temperature and salinity may not be reasonably detectable and thus cannot be rigorously taken into account. Therefore, effects of salinity and temperature may be approximated and/or averaged and computations need not be carried out to high accuracy. Therefore, tables of compensation coefficients referred to above need not be particularly extensive or detailed with high resolution and thus may be of small size, easily accommodated in software and or memory of the sonar receiver 3, 3A unit and processor 12 and software 20 therein. By the same token, the processor 12 need not be of particularly great processing power to perform the required calculations, including the solid geometry angles for the transmitter and diver depth and horizontal distance projection and corrections, with acceptable response time. It should be noted that the correction for depth difference will generally be the most significant correction to be made, particularly where the diver depth excursion may be large, but that the relative importance of temperature and salinity effects will increase substantially with distance from the sonar transmitter. Nevertheless, the above-described corrections and compensations may be carried out to any desired degree of accuracy to complement the accuracy of current and foreseeable GPS systems.

Embodiment Five

Figure 6:
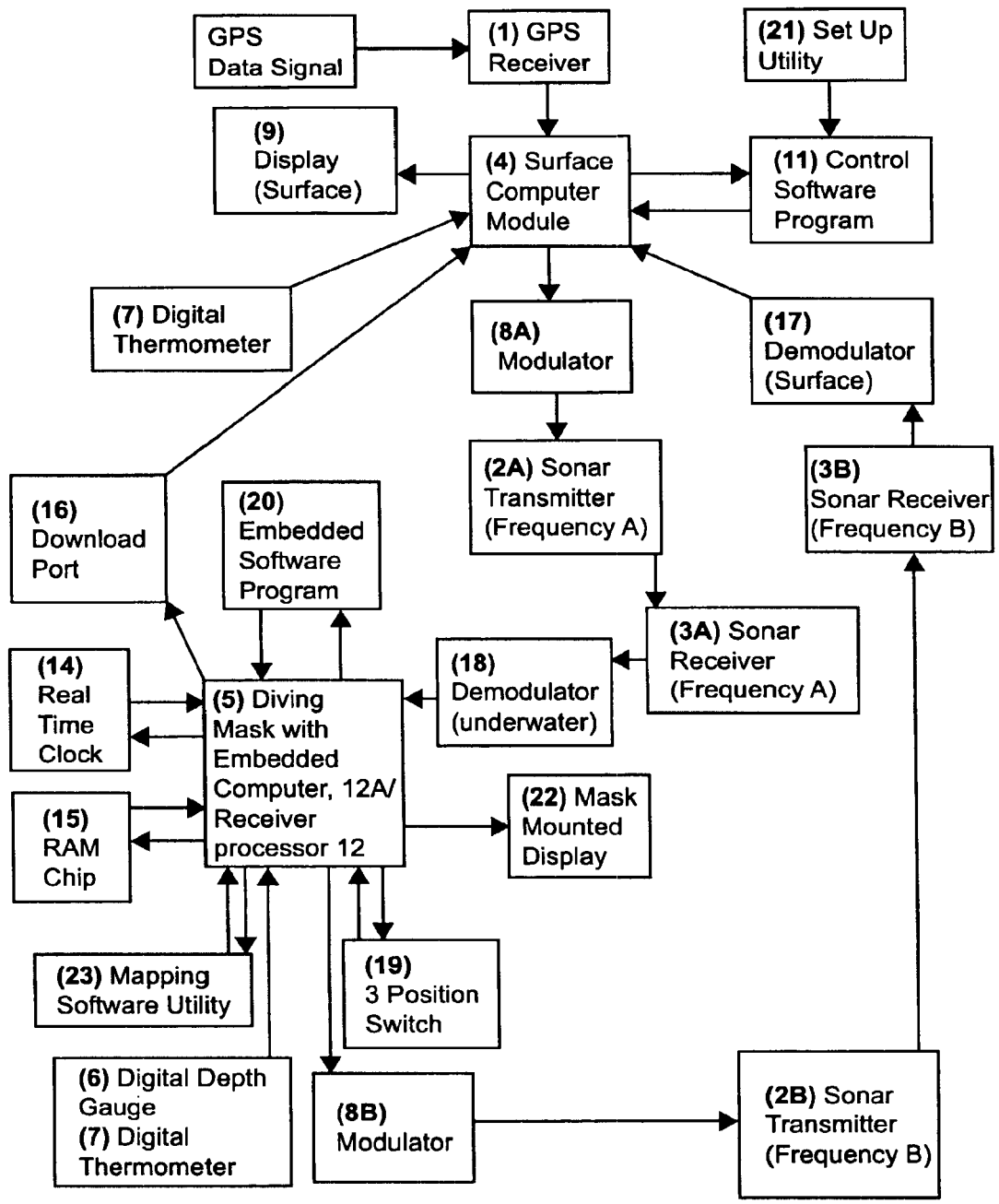

As a further enhancement to the invention, as illustrated in FIG. 6, the apparatus and system described in the embodiments above, are further incorporated with the system described by International Patent Application PCT/US01/20064 corresponding to U.S. patent application Ser. No. 09/914,969, "Diving Mask with Embedded Computer System", fully incorporated by reference above, which details a voice controlled computer that is integrated within a (scuba) diving mask, as illustrated in FIG. 1A. In this embodiment, the (Frequency A) sonar receiver 3A unit does not necessarily include an integral visual display which, preferably, may be provided as a small module instead, such as that produced by XIOS, alluded to above, that is electrically connected to a data I/O port on the diving mask and houses only the actual sonar receiving sensor and receiver processor 12 that performs only the basic distance/direction calculation. Basic distance/direction calculation results are directed via the data I/O port to a central computer 12A residing in the diving mask 5 which now assumes the role of the previously described secondary processor 12'. The central computer 12A performs the ancillary processing required to deliver corrected GPS data and simultaneously directs the corrected information to a display 22 which preferably resides on or is attached to the lens of the diving mask, placing the data in the direct field of view of the diver, and to the Frequency B sonar transmitter which is electrically connected to the central computer 12A via a data I/O port.

In this integrated embodiment, the diver now has access to all the full features described by the computer integrated diving mask apparatus in any or all of the embodiments and variations thereon described above. As a further enhancement, facilitated by this integration, a map or graphical representation of a previously surveyed excursion site can be alternately loaded on both the memory of the computer integrated diving mask and the Surface Computer Module 4 containing the Control Software Program 11 as an additional mapping software utility 23 so as to enable the diver to navigate the excursion site by tracking his current GPS location against the locations annotated on the map or graphical representation by viewing the data on the display that resides on or is attached to the diving mask. Alternatively, for previously un-surveyed excursion sites, the diver is now enabled to create a new survey by utilizing a template which will record his traverse and can be annotated using the "Mark" command. "Mark" commands and other annotations to the survey can be made alternately or conjunctively by utilization of the voice control, digital camera, or tactile diver input system described by "Diving Mask with Embedded Computer" apparatus.

In view of the foregoing, it is seen that the invention provides a convenient apparatus for allowing accurate GPS-based positioning in an underwater environment which is of comparable accuracy to application of a GPS in an above-water environment and which can be made of comparable accuracy to the GPS data directly obtained. The invention thus provides accurate, repeatable and geographically-based position determination in an underwater environment and supports mapping and potentially archival storage of records concerning position and tracking of divers and/or submersible vehicles and other functions beyond mere homing applications.

While the invention has been described in terms of a basic preferred embodiment and variations thereon including various perfecting features providing enhanced accuracy and convenience of use, those skilled in the art will recognize that the invention can be practiced with modification within the spirit and scope of the appended claims.

What is claimed is:

1. A position determination system suitable for underwater deployment, where global positioning system signals do not propagate, said system comprising
a global positioning system (GPS) for providing GPS data representing a position of a GPS receiver,
a submersible sonar ranging transmitter and receiver providing ranging data representing a distance and direction between said sonar receiver and said sonar transmitter, said sonar transmitter being located relative to said GPS receiver, and
means for combining said ranging data with said GPS data to provide geographically-referenced position data representing a position of said sonar receiver.

2. The position determination system as recited in claim 1 further including
means for transmitting GPS data over a communication link provided by said sonar ranging transmitter and receiver.

3. The position determination system as recited in claim 2, further including a communication link from said sonar receiver to said sonar transmitter.

4. The position determination system as recited in claim 3, wherein said communication link provided from said sonar receiver to said sonar transmitter is a separate communication channel from said communication link provided by said sonar ranging transmitter and receiver.

5. The position determination system as recited in claim 1, further including
means for selectively storing said geographically-referenced position data.

6. The position determination system as recited in claim 5, further including
means for recalling stored geographically-referenced position data.

7. The position determination system as recited in claim 6, wherein said means for selectively storing and said means for recalling include a three-position switch.

8. The position determination system as recited in claim 5, further including
a download port for transferring stored geographically-referenced position data to a processor.

9. The position determination system as recited in claim 1, further including means for correction of said ranging data for at least one of depth relative to said sonar transmitter, water temperature and water salinity.

10. The position determination system as recited in claim 1, wherein said means for combining said ranging data with said GPS data to provide geographically-referenced position data and a display are integrated with a diving mask.

11. The position determination system as recited in claim 1 further including an additional sonar transmitter and an additional sonar receiver.

12. A position determination enhancement for connection with a submersible sonar ranging transmitter and receiver system for providing ranging data representing distance and direction between said sonar transmitter and said sonar receiver and suitable for underwater deployment, said sonar transmitter being located relative to a global positioning system receiver, said enhancement comprising
a global positioning system (GPS) for providing GPS data representing a position of said GPS receiver, and
submersible means for combining said ranging data with said GPS data to provide geographically-referenced position data representing an underwater a position of said sonar receiver, where GPS signals do not propagate.

13. The position determination enhancement as recited in claim 12 further including
means for transmitting GPS data over a communication link provided by said sonar ranging transmitter and receiver.

14. The position determination enhancement as recited in claim 13, further including a communication link from said sonar receiver to said sonar transmitter.

15. The position determination enhancement as recited in claim 14, wherein said communication link provided from said sonar receiver to said sonar transmitter is a separate communication channel from said communication link provided by said sonar ranging transmitter and receiver.

16. The position determination enhancement as recited in claim 12, further including
means for selectively storing said geographically-referenced position data.

17. The position determination enhancement as recited in claim 16, further including
means for recalling stored geographically-referenced position data.

18. The position determination enhancement as recited in claim 17, wherein said means for selectively storing and said means for recalling include a three-position switch.

19. The position determination system as recited in claim 16, further including
a download port for transferring stored geographically-referenced position data to a processor.

20. The position determination enhancement as recited in claim 12, further including means for correction of said ranging data for at least one of depth relative to said sonar transmitter, water temperature and water salinity.

21. The position determination enhancement as recited in claim 12, wherein said means for combining said ranging data with said GPS data to provide geographically-referenced position data and a display are integrated with a diving mask.

22. A method for underwater position determination including steps of
determining underwater distance and direction ranging information between a sonar transmitter located relative to a global positioning system receiver and a submersible sonar receiver, where GPS signals do not propagate,
providing global positioning system (GPS) data to a processor associated with said sonar receiver, and
combining said ranging information with said GPS data to estimate a position of said sonar receiver.

23. The method as recited in claim 22, further including a step of
correcting said GPS data based on a plurality of sets of said ranging data.

24. The method as recited in claim 22, further including a step of
selectively storing an estimated position of said sonar receiver.

* * * * *